United States Patent
Aoyagi et al.

(10) Patent No.: US 8,718,664 B2
(45) Date of Patent: May 6, 2014

(54) MOBILE DEVICE, COMMUNICATION CONTROL DEVICE, AND COMMUNICATION CONTROL METHOD

(75) Inventors: Kenichiro Aoyagi, Tokyo (JP); Mikio Iwamura, Tokyo (JP); Wuri Andarmawanti Hapsari, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/816,268

(22) PCT Filed: Aug. 10, 2011

(86) PCT No.: PCT/JP2011/068309
§ 371 (c)(1),
(2), (4) Date: Apr. 19, 2013

(87) PCT Pub. No.: WO2012/020807
PCT Pub. Date: Feb. 16, 2012

(65) Prior Publication Data
US 2013/0225190 A1    Aug. 29, 2013

(30) Foreign Application Priority Data
Aug. 11, 2010   (JP) ................. P2010-180643

(51) Int. Cl.
*H04W 72/00*  (2009.01)
(52) U.S. Cl.
USPC ............. 455/452.1; 455/435.2; 455/422.1; 455/445
(58) Field of Classification Search
USPC ............. 455/422.1, 452.1, 445, 435.3, 435.2
See application file for complete search history.

(56) References Cited

U.S. PATENT DOCUMENTS

| 2007/0238454 A1* | 10/2007 | Chambers ................. 455/422.1 |
| 2010/0240367 A1* | 9/2010 | Lee et al. ................. 455/435.2 |
| 2011/0070888 A1* | 3/2011 | Iwamura et al. ............ 455/435.3 |

FOREIGN PATENT DOCUMENTS

| JP | 2010-093838 A | 4/2010 |
| JP | 2010-141669 A | 6/2010 |
| JP | 2010-154079 A | 7/2010 |
| JP | 2010-178203 A | 8/2010 |

OTHER PUBLICATIONS

International Search Report from PCT/JP2011/068309 mailed on Nov. 29, 2011 (4 pages).
I. Tanaka. et al.; "LTE to 3G Kaisen Kokan Service no Renkei o Jitsugen suru CS Fallback Kino"; NTT DOCOMO Technical Journal, vol. 17, No. 3, The Telecommunications Association, Oct. 1, 2009, pp. 15-20 (13 pages).

(Continued)

*Primary Examiner* — David Q Nguyen
(74) *Attorney, Agent, or Firm* — Osha Liang LLP (57) ABSTRACT

A mobile device (300) is wirelessly connectable to an LTE system configured to notify the mobile device of priority call information indicating a priority level of processing for an terminating call, and a 3G system configured to inform the mobile device of access class barring information specifying barring of an terminating call depending on an access class of the terminating call. If the terminating call is a priority call whose priority level in the priority call information indicates a higher processing priority than other calls and the barring by the access class barring information is set, the mobile device (300) executes connection to 3G system (20) and processes the terminating call, regardless of the access class barring information.

6 Claims, 5 Drawing Sheets

(56) References Cited

OTHER PUBLICATIONS

ETSI TS 122 153 V9.2.0; "Digital cellular telecommunications system (Phase 2+); Universal Mobile Telecommunications System (UMTS); LTE; Multimedia priority service (3GPP TS 22.153 version 9.2.0 Release 9)"; Jan. 2010; (11 pages).

3GPP TS 22.153 V9.2.0; "3rd Generation Partnership Project; Technical Specification Group Services and System Aspects; Multimedia priority service (Release 9)"; Dec. 2008 (9 pages).

3GPP TS 25.331 V9.3.0; "3rd Generation Partnership Project; Technical Specification Group Radio Access Network; Radio Resource Control (RRC); Protocol specification (Release 9)"; Jun. 2010 (1786 pages).

Japanese Office Action w/translation for corresponding Japanese Application No. 2010-180643 mailed May 15, 2012 (10 pages).

ETSI TS 124 067 V9.0.0; "Digital cellular telecommunications system (Phase 2+); Universal Mobile Telecommunications System (UMTS); LTE; Enhanced Multi-Level Precedence and Pre-emption service (eMLPP); Stage 3 (3GPP TS 24.067 version 9.0.0 Release 9)"; Jan. 2010; (2 pages).

ETSI TS 123 272 V9.4.0; "Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 9.4.0 Release 9)"; Jun. 2010; (4 pages).

Ntt Docomo et al.; "Clarification on the case when access class control is applied in the legacy access"; 3GPP TSG-SA WG2 Meeting #67; S2-086179; Sophia Antipolis, France; Aug. 25-29, 2008 (2 pages).

ETSI TS 125 331 V9.3.0; "Universal Mobile Telecommunications System (UMTS); Radio Resource Control (RRC); Protocol specification (3GPP TS 25.331 version 9.3.0 Release 9)"; Jul. 2010; (2 pages).

Written Opinion of the International Searching Authority from PCT/JP2011/068309 mailed on Nov. 29, 2011 (4 pages).

\* cited by examiner

MOBILE DEVICE, COMMUNICATION CONTROL DEVICE, AND COMMUNICATION CONTROL METHOD

TECHNICAL FIELD

The present invention relates to a mobile device, a communication control device, and a communication control method, the mobile device being wirelessly connectable to a first radio communication system configured to notify the mobile device of priority call information indicating a priority level of processing for an terminating call and to a second radio communication system configured to notify the mobile device of access class barring information specifying barring of an terminating call.

BACKGROUND ART

In a Multimedia Priority Service (MPS) of Long Term Evolution (LTE), it has been considered that a mobile device is notified of priority call information indicating a priority level of processing for an terminating call included in an terminating call signal (PAGING) or an RRC control signal such as an RRC CONNECTION RELEASE (see Non-Patent Document 1). The mobile device executes priority control of the terminating call based on the informed priority level.

Meanwhile, CS (Circuit Switched) fallback (hereinafter, CSFB) from an LTE system (hereinafter, LTE) to a 3G system (hereinafter, 3G) is specified such that a mobile device follows access class barring information (AC/DSAC/PPAC) set in 3G when transmitting an RRC CONNECTION REQUEST in 3G (see Non-Patent Document 2).

CITATION LIST

Non-Patent Document

Non-Patent Document 1: 3GPP TS 22.153, Technical Specification Group Services and System Aspects; Multimedia priority service Non-Patent Document 2: 3GPP TS 25.331, Technical Specification Group Radio Access Network; Radio Resource Control (RRC); Protocol specification

DISCLOSURE OF THE INVENTION

However, the above-described conventional methods have the following problem. Specifically, since a mobile device follows access class barring information of 3G after performing a CSFB from LTE to 3G, priority call information of LTE may not be reflected in some cases. Accordingly, a terminating call to be handled as a priority call to be processed with a higher priority than other calls in LTE is barred by access class barring information of 3G. As a result, there is a possibility that the mobile device fails to receive the terminating call.

Therefore, an objective of the present invention is to provide a mobile device, a communication control device, and a communication control method which are capable of performing terminating call control appropriate for conditions of ratio communication systems, even when the setting of the priority level of the terminating call differs between the radio communication systems.

A first aspect of the present invention is summarized by a mobile device (mobile device 300) wirelessly connectable to a first radio communication system (LTE system 10) configured to notify the mobile device of priority call information indicating a priority level of processing for an terminating call and to a second radio communication system (3G system 20) configured to inform the mobile device of access class barring information specifying barring of the terminating call depending on an access class of the terminating call, in which if the terminating call is a priority call whose priority level in the priority call information indicates a higher processing priority than other calls and the barring by the access class barring information is set, the mobile device executes connection to the second radio communication system and processes the terminating call, regardless of the access class barring information.

A second aspect of the present invention is summarized by a mobile device wirelessly connectable to a first radio communication system configured to notify the mobile device of priority call information indicating a priority level of processing for an terminating call and to a second radio communication system configured to inform the mobile device of access class barring information specifying barring of the terminating call depending on an access class of the terminating call, in which if the terminating call is a priority call whose priority level in the priority call information indicates a higher processing priority than other calls and the barring by the access class barring information is set, the mobile device memorizes the terminating call as an emergency call in the second radio communication system, or an access class not subjected to the barring in the second radio communication system, executes connection to the second radio communication system, and processes the terminating call.

A third aspect of the present invention is summarized by a mobile device wirelessly connectable to a first radio communication system configured to notify the mobile device of priority call information indicating a priority level of processing for an terminating call and to a second radio communication system configured to inform the mobile device of access class barring information specifying barring of the terminating call depending on an access class of the terminating call, in which if the terminating call is a priority call whose priority level in the priority call information indicates a higher processing priority than other calls and the barring by the access class barring information is set, the mobile device executes connection to the second radio communication system in accordance with the access class barring information and processes the terminating call, regardless of the priority level in the priority call information.

Furthermore, when the mobile device is not allowed to execute connection to the second radio communication system in accordance with the access class barring information, the mobile device may execute the connection to the second radio communication system via a cell that is different from a cell where the mobile device is located.

A fifth aspect of the present invention is summarized by a communication control device (for example, eNodeB 110) which transmits information to a mobile device. In a first radio communication system configured to notify the mobile device of priority call information indicating a priority level of processing for an terminating call to the mobile device and a second radio communication system configured to inform the mobile device of access class barring information specifying barring of the terminating call depending on an access class of the terminating call, the communication control device sends the mobile device an access class not barred by the access class barring information or operation specifying information which specifies an operation to be performed by the mobile device when the priority level and the barring conflict with each other.

A sixth aspect of the present invention is summarized by a communication control method for a mobile device wirelessly connectable to a first radio communication system configured to notify the mobile device of priority call information indicating a priority level of processing for an terminating call and to a second radio communication system configured to inform the mobile device of access class barring information specifying barring of the terminating call depending on an access class of the terminating call. If the terminating call is a priority call whose priority level in the priority call information indicates a higher processing priority than other calls and the barring by the access class barring information is set, the communication control method causes the mobile device to execute connection to the second radio communication system and to process the terminating call, regardless of the access class barring information.

A seventh aspect of the present invention is summarized by a communication control method for a mobile device wirelessly connectable to a first radio communication system configured to notify the mobile device of priority call information indicating a priority level of processing for an terminating call and to a second radio communication system configured to inform the mobile device of access class barring information specifying barring of the terminating call depending on an access class of the terminating call. If the terminating call is a priority call whose priority level in the priority call information indicates a higher processing priority than other calls and the barring by the access class barring information is set, the communication control method causes the mobile device to memorize the terminating call as an emergency call in the second radio communication system, or an access class not subjected to the barring in the second radio communication system, to execute connection to the second radio communication system, and to process the terminating call.

An eighth aspect of the present invention is summarized by a communication control method for a mobile device wirelessly connectable to a first radio communication system configured to notify the mobile device of priority call information indicating a priority level of processing for an terminating call and to a second radio communication system configured to inform the mobile device of access class barring information specifying barring of the terminating call depending on an access class of the terminating call. If the terminating call is a priority call whose priority level in the priority call information indicates a higher processing priority than other calls and the barring by the access class barring information is set, the communication control method causes the mobile device to execute connection to the second radio communication system in accordance with the access class barring information, and to process the terminating call, regardless of the priority level in the priority call information.

MODE FOR CARRYING OUT THE INVENTION

Next, an embodiment of the present invention will be explained. In the descriptions of the following drawings, the same or similar reference numerals are given to the same or similar portions. However, it should be noted that the drawings are schematic and the ratios of sizes or the like differ from an actual one.

Therefore, the specific sizes and the like should be determined in consideration of the descriptions below. The portions where the relation and the ratio of the sizes differ may be also included among the drawings.

(1) Overall Schematic Configuration of Radio Communication System

Figure 1:
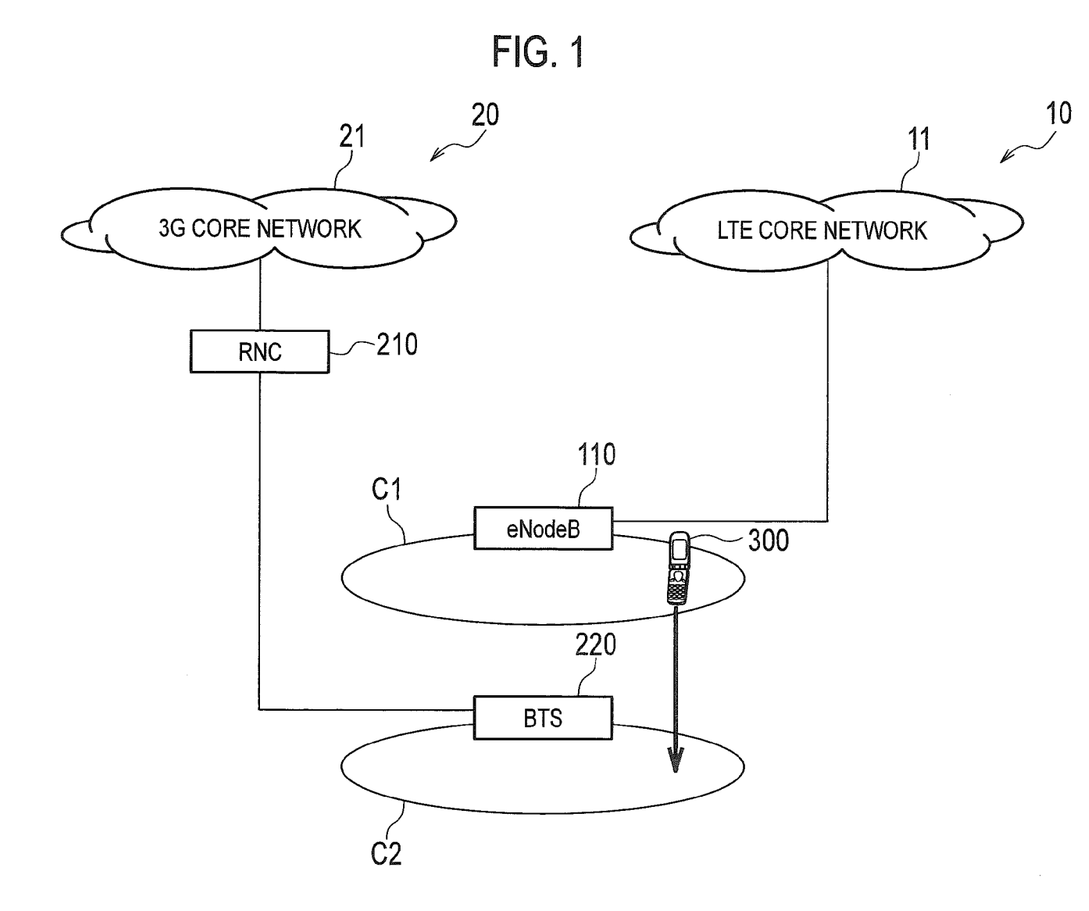
FIG. 1 is an overall schematic configuration diagram of a radio communication system according to an embodiment of the present invention.

FIG. 1 is an overall schematic configuration diagram of a radio communication system according to the embodiment of the present invention. As shown in FIG. 1, a radio communication system according to the present embodiment is composed of an LTE system 10 and the 3G system 20.

The LTE system 10 is a radio communication system in conformity with an LTE scheme. The 3G system 20 is a radio communication system in conformity with a 3G scheme (W-CDMA).

The LTE system 10 includes an LTE core network 11 and an eNodeB 110. The 3G system 20 includes a 3G core network 21, an RNC 210, and a BTS 220.

A mobile device 300 is wirelessly connectable to the LTE system 10 and the 3G system 20. Specifically, the mobile device 300 executes radio communication to the eNodeB 110 to connect to the LTE system 10. Furthermore, the mobile device 300 executes radio communication to the BTS 220 to connect to the 3G system 20.

The LTE system 10 (first radio communication system) transmits various types of notification information to the mobile device 300. Specifically, the eNodeB 110 causes an terminating call signal (PAGING) to include priority call information indicating a priority level of processing for an terminating call to the mobile device 300, based on the Multimedia Priority Service (MPS). The eNodeB 110 sends a notification of the terminating call signal to a cell C1 formed by the eNodeB 110.

The 3G system 20 (second radio communication system), specifically, the RNC 210 sends a cell C2 formed by the BTS 220 a notification of access class barring information specifying barring of an terminating call to the mobile device 300 depending on the type of the terminating call.

Furthermore, the eNodeB 110 transmits notification information specifying an operation of the mobile device 300 when the priority level in the priority call information and the barring by the access class barring information conflict with each other, to the mobile device 300.

(2) Functional Block Configuration of Radio Communication System

Next, among devices that constitute the above-described radio communication system, the functional block configurations of the principal devices will be explained.

Figure 2:
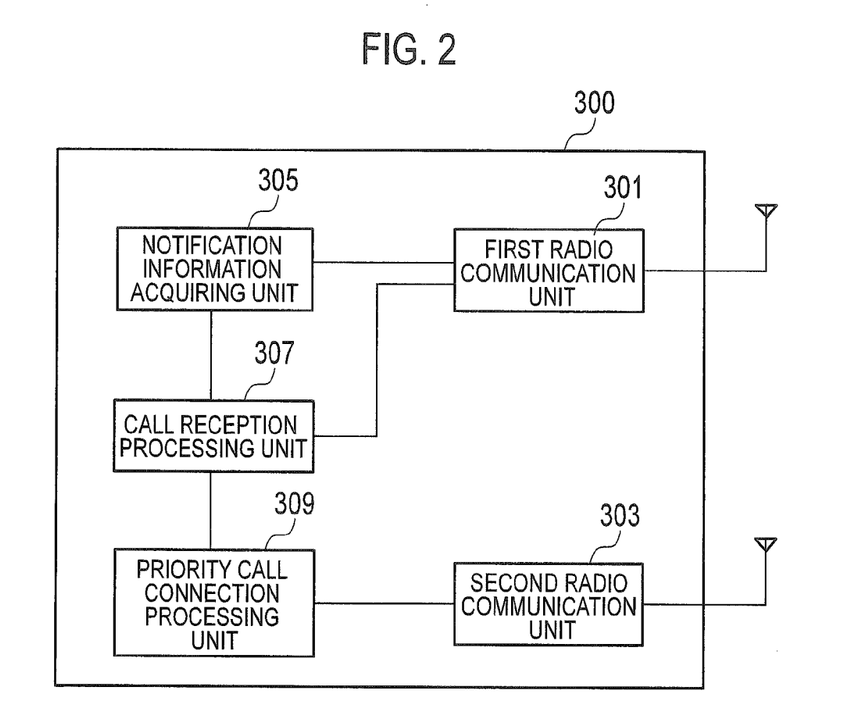
FIG. 2 is a functional block configuration diagram of a mobile device 300 according to the embodiment of the present invention.
Figure 3:
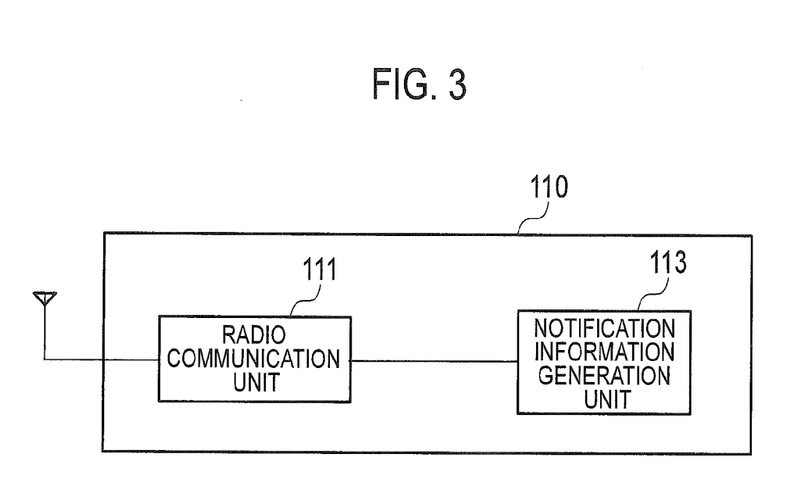
FIG. 3 is a functional block configuration diagram of an eNodeB 110 according to the embodiment of the present invention.

FIG. 2 is a functional block configuration diagram of the mobile device 300. Furthermore, FIG. 3 is a functional block configuration diagram of the eNodeB 110.

(2.1) Mobile Device 300

As shown in FIG. 2, the mobile device 300 is configured to include a first radio communication unit 301, a second radio communication unit 303, a notification information acquiring unit 305, an call reception processing unit 307, and a priority call connection processing unit 309.

The first radio communication unit 301 executes radio communication to the eNodeB 110 in conformity with the LTE scheme. The second radio communication unit 303 executes radio communication to the BTS 220 in conformity with the 3G scheme.

The notification information acquiring unit 305 acquires notification information transmitted from the eNodeB 110. Specifically, the notification information acquiring unit 305 acquires priority call information indicating a priority level of processing for an terminating call to the mobile device 300. Furthermore, the notification information acquiring unit 305 also can acquire operation specifying information specifying an operation of the mobile device 300 when the priority level in the priority call information and the barring by the access class barring information conflict with each other.

The call reception processing unit 307 executes processing for an terminating call to the mobile device 300. Specifically, the call reception processing unit 307 processes an terminating call received by the mobile device 300 via the LTE system 10, and establishes a communication route to an origin of the terminating call.

Furthermore, the call reception processing unit 307 executes a CS (Circuit Switched) fallback (CSFB) from the LTE system 10 to the 3G system 20. In other words, the call reception processing unit 307 executes the processing for the terminating call via the 3G system 20. In this case, the call reception processing unit 307 determines a content of the processing for the terminating call based on the priority call information of LTE and the access class barring information of 3G.

When a priority level of the terminating call targeted for the CSFB is a priority call to be processed with a higher priority than other calls, the priority call connection processing unit 309 executes connection processing for the priority call based on the content of the processing for the terminating call determined by the call reception processing unit 307. Note that, the detailed content of the processing for the terminating call (priority call) will be described below.

(2.2) eNodeB 110

As shown in FIG. 3, the eNodeB 110 is configured to include a radio communication unit 111 and a notification information generation unit 113. In the present embodiment, the eNodeB 110 constitutes a communication control device that transmits information to the mobile device 300.

The radio communication unit 111 executes radio communication to the mobile device 300 in conformity with the LTE scheme.

The notification information generation unit 113 generates notification information to be transmitted to the mobile device 300. Specifically, the notification information generation unit 113 generates priority call information indicating a priority level of processing for an terminating call to the mobile device 300.

Furthermore, the notification information generation unit 113 generates operation specifying information that specifies an operation to be performed by the mobile device 300 when the priority level in the priority call information and the barring by the access class barring information conflict with each other. The operation specifying information specifies to which of a priority level specified by the priority call information of LTE and barring (AC/DSAC/PPAC) specified by the access class barring information a higher priority is assigned. Note that, AC, DSAS, and PPAC mean Access Control, Domain Specific Access Control, and Paging Permission with Access Control, respectively, and barring levels thereof vary in some cases. Note that, the notification information generation unit 113 may instruct an access class (an emergency call or a priority call) that is exempted from the access class barring of the 3G system 20 after the mobile device 300 hands over to the 3G system 20.

The priority call information and the operation specifying information generated by the notification information generation unit 113 are transmitted to the mobile device 300 via the radio communication unit 111.

The priority call information is notified by being included in a PAGING or an RRC CONNECTION RELEASE. The operation specifying information can be transmitted by being included in a PAGING or an RRC CONNECTION RELEASE. Furthermore, the operation specifying information may be included in UTRA-SIB information provided on the RRC CONNECTION RELEASE. Alternatively, the operation specifying information may be transmitted as separate notification information.

(3) Operation of Radio Communication System

Figure 4:
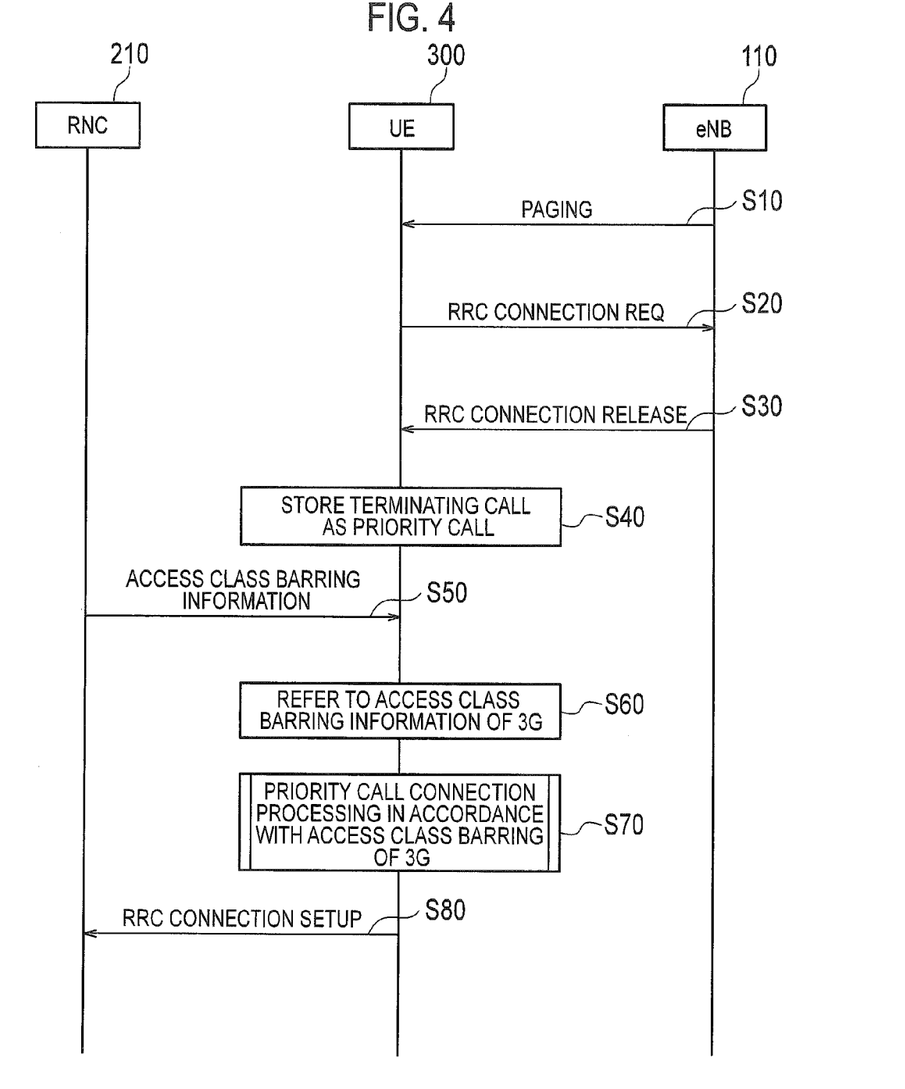
FIG. 4 is a diagram illustrating an entire communication sequence of the radio communication system according to the embodiment of the present invention.
Figure 5:
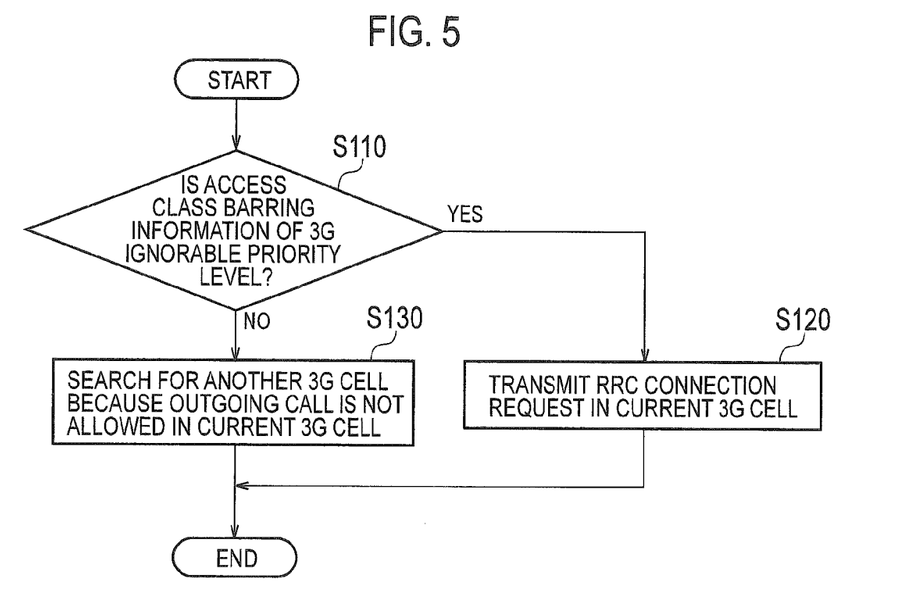
FIG. 5 is a diagram illustrating an operation flow (first example) of the mobile device 300 according to the embodiment of the present invention.
Figure 6:
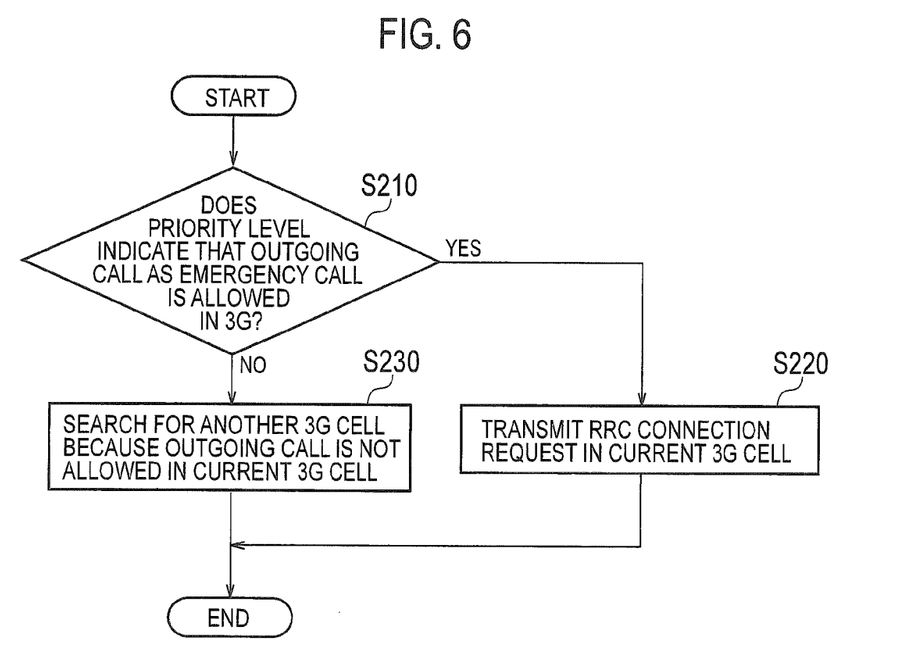
FIG. 6 is a diagram illustrating an operation flow (second example) of the mobile device 300 according to the embodiment of the present invention.
Figure 7:
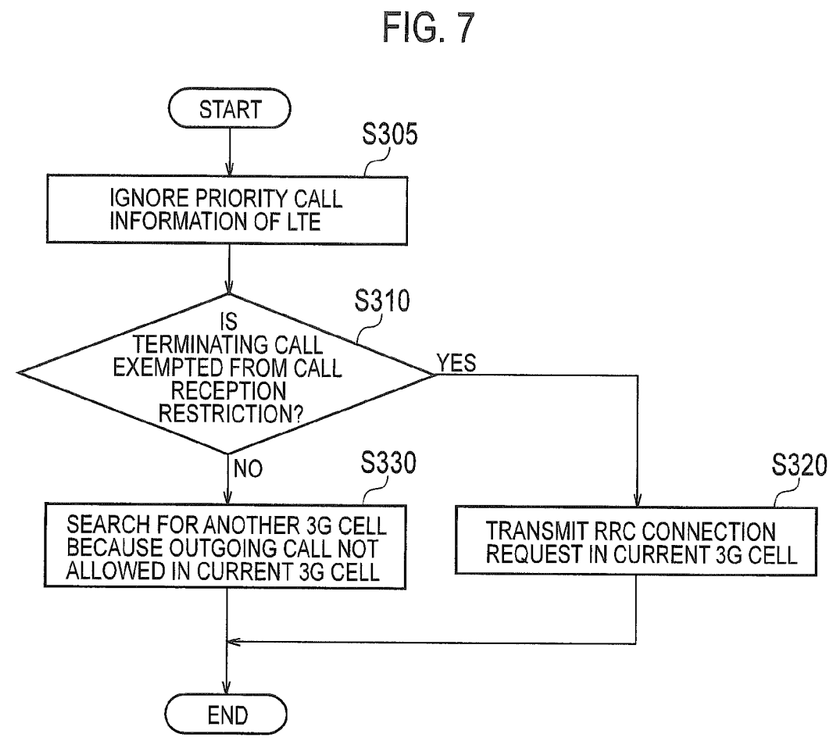
FIG. 7 is a diagram illustrating an operation flow (third example) of the mobile device 300 according to the embodiment of the present invention.

Next, the operation of the above-described radio communication system will be explained with reference to FIG. 4 to FIG. 7. FIG. 4 indicates an entire communication sequence of the radio communication system according to the present embodiment. FIG. 5 to FIG. 7 indicate operation flows of the mobile device 300 when the CSFB is executed.

(3.1) Entire Communication Sequence

As shown in FIG. 4, at Step S10, the eNodeB 110 transmits a PAGING to the mobile device 300, based on a CSFB procedure using Redirection. As described above, the PAGING includes priority call information.

At Step S20, the mobile device 300 transmits an RRC CONNECTION REQUEST to the eNodeB 110.

At Step S30, the eNodeB 110 transmits an RRC CONNECTION RELEASE to the mobile device 300, based on the RRC CONNECTION REQUEST received from the mobile device 300. In this manner, a fallback to the 3G system 20 is instructed.

At Step S40, the mobile device 300 memorizes an terminating call to the mobile device 300 as a priority call, based on priority call information included in the PAGING.

At Step S50, the RNC 210 sends the mobile device 300 via the BTS 220 access class barring information specifying barring of the terminating call to the mobile device 300 depending on the type of the terminating call. Note that, the mobile device 300 is not necessary to receive the access class barring information at a timing after Step S40.

At Step S60, the mobile device 300 refers to the received access class barring information, and determines the type of barring (call reception restriction) in the 3G system 20.

At Step S70, the mobile device 300 executes connection processing for the terminating call (priority call) in accordance with the access class barring (call reception restriction) of 3G. Note that, the processing will be described in details below.

At Step S80, the mobile device 300 transmits an RRC CONNECTION REQUEST that requests connection of the priority call via the 3G system 20 to the RNC 210, based on a result of the connection processing for the priority call. Note that, an Establishment cause indicating that the priority call is received may be set in the RRC CONNECTION REQUEST.

(3.2) Operation Flow of Mobile Device 300

Next, an operation flow of the mobile device 300, specifically, an operation of the mobile device 300 at Step S70 (priority call connection processing) and at Step S80, which are described above, will be explained.

The mobile device 300 can execute operations shown in a first example to a third example when the priority level of the terminating call based on the priority call information is a priority call and the barring by the access class barring information is set.

(3.2.1) First Example

As shown in FIG. 5, at Step S110, the mobile device 300 determines whether or not the barring (AC/DSAC/PPAC) specified by the access class barring information of 3G is an ignorable priority level, in comparison with the priority level of the terminating call in the priority call information of LTE. Note that, this determination can be performed in an RRC layer or a service application layer.

For example, when a priority level in the priority call information is "high" and an access class to be barred is specified by the access class barring information, it is determined that the barring (call reception restriction) can be ignored.

If the call reception restriction is an ignorable priority level (YES at Step S110), the mobile device 300 transmits the RRC CONNECTION REQUEST in the 3G cell (cell C2) at Step S120.

If the call reception restriction is not an ignorable priority level (NO at Step S110), the mobile device 300 searches for another 3G cell at Step S130 because an outgoing call is not allowed in the 3G cell (cell C2).

With this manner, in the first example, the mobile device 300 executes connection to the 3G system 20 and processes the terminating call, regardless of the barring by the access class barring information.

Furthermore, if the call reception restriction is not an ignorable priority level, the mobile device 300 can execute connection to the 3G system 20 via a cell that is different from a cell where the mobile device 300 is located.

(3.2.2) Second Example

As shown in FIG. 6, at Step S210, the mobile device 300 determines whether or not the priority level of the terminating call based on the priority call information of LTE is a priority level in which an outgoing call as an emergency call is allowed in the 3G system 20. Note that, the emergency call is an terminating call not subjected to access class barring.

For example, when a priority level in the priority call information is "high", the priority level is determined as a priority level in which an outgoing call as an emergency call is allowed.

Processes at Step S220 and S230 are similarly to those at Step S120 and S130.

With this manner, in the second example, the mobile device 300 executes connection to the 3G system 20 as an emergency call to be processed with the highest priority among other calls in the 3G system 20, and processes the terminating call. Note that, the mobile device 300 may execute connection to the 3G system 20 not as an emergency call but as a terminating call of an access class not subjected to barring in the 3G system 20.

Furthermore, if the priority level of the terminating call based on the priority call information is not a priority level in which an outgoing call as an emergency call is allowed in the 3G system 20, the mobile device 300 can execute connection to the 3G system 20 via a cell that is different from a cell where the mobile device 300 is located.

(3.2.3) Third Example

As shown in FIG. 7, at Step S305, the mobile device 300 ignores the priority call information of LTE.

At Step S310, the mobile device 300 determines whether or not the terminating call is exempted from call reception restriction specified by the access class barring information of 3G.

For example, when a priority level in the priority call information is "low", it is determined that the terminating call follows the access class barring information.

Processes at Step at Step S320 and S330 are similarly to those at Step S120 and S130.

With this manner, in the third example, the mobile device 300 executes connection to the 3G system 20 in accordance with the barring by the access class barring information and processes the terminating call, regardless of the priority level in the priority call information.

Furthermore, if the mobile device 300 cannot execute connection to the 3G system 20 in accordance with the barring by the access class barring information, the mobile device 300 can execute connection to the 3G system 20 via a cell that is different from a cell where the mobile device 300 is located.

(4) Operation and Effect

With the radio communication system according to the present embodiment, the mobile device 300 executes the operations shown in the first example to the third example when the priority level of the terminating call based on the priority call information of LTE is a priority call and the barring by the access class barring information of 3G is set.

Accordingly, a terminating call to be handled as a priority call is barred by access class barring information of 3G. As a result, it can be reduced a possibility that the mobile device fails to receive the terminating call. In summary, even when the setting of the priority level of the terminating call differs between the LTE system 10 and the 3G system 20, terminating call control appropriate for conditions of the radio communication systems can be performed.

(5) Other Embodiments

As described above, although the content of the present invention is disclosed through one embodiment of the present invention, it should not be understood that the statements and the drawings constituting a part of the disclosure intend to limit the present invention. Various forms of modifications would be obvious to a person skilled in the art from the disclosure.

For example, operation specifying information specifying an operation of the mobile device 300, in a case where the priority level in the priority call information and the barring by the access class barring information conflict with each other, may be informed not from the LTE system 10 but from the 3G system 20.

In the above-described embodiment, although a case where a first radio communication system is the LTE system 10 and a second radio communication system is the 3G system 20 has been explained, the configuration is not necessarily limited to such a case. For example, both the systems may be LTE systems, or LTE system may inform of access class barring information relating to the CSFB.

In the above-described embodiment, although a case where the mobile device 300 executes the operations of the first example to the third example separately has been explained, the mobile device 300 may be configured to search for another 3G cell when all the determinations at Step S110, S210, and S310 are "NO". Furthermore, the operations at Step S130 in the first example and at Step S230 in the second example may be not necessarily executed.

With this manner, it is needless to say that the present invention includes various embodiments and the like which are not described herein. Accordingly, the technical range of the present invention is only defined by the inventive specific matters related to the claims appropriate from the above-described explanation. Note that, the entire contents of Japanese Patent Application 2010-180643 (filed on Aug. 11, 2010) are incorporated in the description of the present application by reference.

INDUSTRIAL APPLICABILITY

According to the aspects of the present invention, even when the setting of the priority level of the terminating call differs between radio communication systems, terminating call control appropriate for conditions of the radio communication systems can be performed.

REFERENCE SIGNS LIST

10 LTE system
11 LTE core network
3G system
3G core network
110 eNodeB
111 radio communication unit
113 notification information generation unit
210 RNC
220 BTS
300 mobile device
301 first radio communication unit
303 second radio communication unit
305 notification information acquiring unit
307 call reception processing unit
309 priority call processor

The invention claimed is:

1. A mobile device wirelessly connectable to a first radio communication system configured to notify the mobile device of priority call information indicating a priority level of processing for an terminating call and to a second radio communication system configured to inform the mobile device of access class barring information specifying barring of the terminating call depending on an access class of the terminating call, wherein
if the terminating call is a priority call whose priority level in the priority call information indicates a higher processing priority than other calls and the barring by the access class barring information is set, the mobile device executes connection to the second radio communication system and processes the terminating call, regardless of the priority and the barring conflicting each other, and
the priority call information is notified by being included in an RRC CONNECTION RELEASE.

2. A mobile device wirelessly connectable to a first radio communication system configured to notify the mobile device of priority call information indicating a priority level of processing for an terminating call and to a second radio communication system configured to inform the mobile device of access class barring information specifying barring of the terminating call depending on an access class of the terminating call, wherein
if the terminating call is a priority call whose priority level in the priority call information indicates a higher processing priority than other calls and the access class barring information is set,
the mobile device executes connection to the second radio communication system in accordance with the access class barring information and processes the terminating call, regardless of the priority and the barring conflicting each other, and
the priority call information is notified by being included in an RRC CONNECTION RELEASE.

3. The mobile device according to claim 2, wherein when the mobile device is not allowed to execute connection to the second radio communication system in accordance with the access class barring information, the mobile device executes the connection to the second radio communication system via a cell that is different from a cell where the mobile device is located.

4. A communication control device configured to transmit information to a mobile device, wherein
in a first radio communication system configured to notify the mobile device of priority call information indicating a priority level of processing for an terminating call to the mobile device and a second radio communication system configured to inform the mobile device of access class barring information specifying barring of the terminating call depending on an access class of the terminating call, the communication control device sends the mobile device an access class not barred by the access class barring information or operation specifying information which specifies an operation to be performed by the mobile device when the priority level and the barring conflict with each other, and
the priority call information is notified by being included in an RRC CONNECTION RELEASE.

5. A communication control method for a mobile device wirelessly connectable to a first radio communication system configured to notify the mobile device of priority call information indicating a priority level of processing for an terminating call and to a second radio communication system configured to inform the mobile device of access class barring information specifying barring of the terminating call depending on an access class of the terminating call, the method comprising:
if the terminating call is a priority call whose priority level in the priority call information indicates a higher processing priority than other calls and the barring by the access class barring information is set, causing the mobile device to execute connection to the second radio communication system in accordance with the access class barring information and to process the terminating call, regardless of the priority and the barring conflicting each other, and
the priority call information is notified by being included in an RRC CONNECTION RELEASE.

6. A communication control method for a mobile device wirelessly connectable to a first radio communication system configured to notify the mobile device of priority call information indicating a priority level of processing for a terminating call and to a second radio communication system configured to inform the mobile device of access class barring information specifying barring of the terminating call depending on an access class of the terminating call, the method comprising:
if the terminating call is a priority call whose priority level in the priority call information indicates a higher processing priority than other calls and the barring by the access class barring information is set, causing the mobile device to execute connection to the second radio communication system and to process the terminating call, regardless of the priority and the barring conflicting each other, and
the priority call information is notified by being included in an RRC CONNECTION RELEASE.

* * * * *